Aug. 21, 1956  C. W. VOGT  2,759,618
TAPE HOLDER AND HEATER
Filed Nov. 12, 1952  2 Sheets-Sheet 1

INVENTOR.
CLARENCE W. VOGT
BY
*Campbell, Brumbaugh, Free & Graves*
his ATTORNEYS Aug. 21, 1956 C. W. VOGT 2,759,618
TAPE HOLDER AND HEATER
Filed Nov. 12, 1952 2 Sheets-Sheet 2

INVENTOR.
CLARENCE W. VOGT
BY
*Campbell, Brumbaugh, Free & Graves*
his ATTORNEYS

United States Patent Office 2,759,618
Patented Aug. 21, 1956

2,759,618

TAPE HOLDER AND HEATER

Clarence W. Vogt, Norwalk, Conn.

Application November 12, 1952, Serial No. 320,053

9 Claims. (Cl. 216—33)

The present invention relates to devices for applying adhesive tapes to desired surfaces, and embodies more particularly a device of such character, wherein heat is utilized to facilitate the adhering of the tape to the desired surface, the severing of the tape after a desired length has been removed from the tape roll, or both.

In using thermoplastic adhesive tapes, heat is, of course, required to cause the adhesive material to become adhesive and an object of this invention is to provide a mechanism by means of which a source of heat is provided in such position with respect to the tape that the adhesive material is activated precisely at the point necessary in order to insure proper operation at all times.

A further object of this invention is to provide a device of the above character, wherein tape cutting mechanism is provided having means to facilitate the cutting operation by means of the utilization of heat.

Yet another object of the invention is to provide a device of the above character wherein the tape cutting means is rendered effective upon utilization of the device to apply tape to a desired surface.

It will be understood, of course, that the mechanism herein described is of utility not only with tapes carrying thermoplastic adhesives, but also with pressure-sensitive and other forms of adhesive. For example, in many instances pressure-sensitive tapes have not been successfully used because of the nature of the surfaces to which they are to be applied. As an illustration, pressure-sensitive tapes do not adhere well to waxed surfaces and the like. In accordance with this invention, tape applying mechanism is provided having heating means embodied therein and so related to the pressure surface which presses the tape against a desired surface that the heat may be utilized to drive the wax or other coating into the fibers of the supporting surface, or away from the adhesive sufficiently to enable the adhesive to alhere effectively to the desired surface.

The foregoing and other objects and advantages are attained by the utilization of a device generally similar to the device shown in applicant's copending application Serial No. 303,587, filed August 9, 1952, for "Pistol Grip Tape Applicator," and in providing an improved form of pressure plate and related electrical mechanism by means of which the pressure plate will be desirably heated and in which there are provided mechanism for additionally heating the cutting device. Preferably, the last named mechanism serves to elevate the temperature of the cutting device to operative cutting temperature only when the pressure plate is in its operative position.

In order that the invention may be set forth more fully, it will now be described with reference to the accompanying drawings, wherein Figure 1 is a view in longitudinal vertical section showing a tape applying mechanism constructed in accordance with this invention, being taken on the section line 1—1 of Figure 2, and looking in the direction of the arrows;

Figure 1:
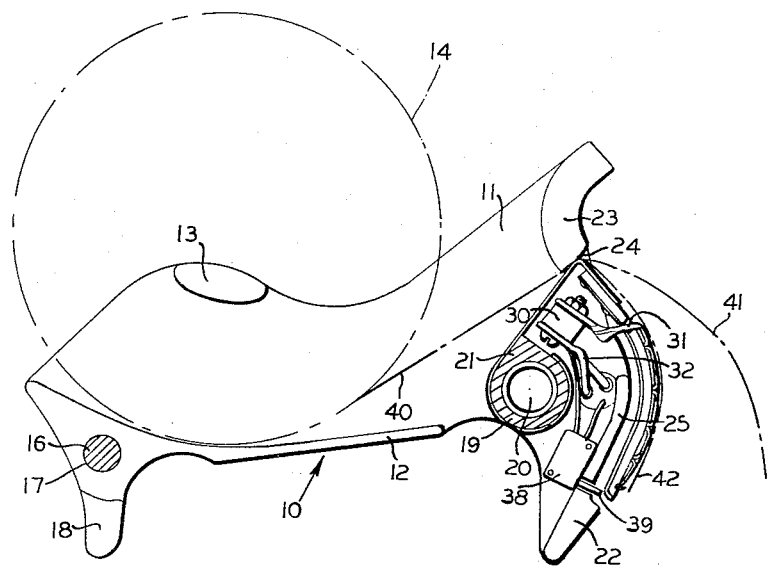
Figure 2:
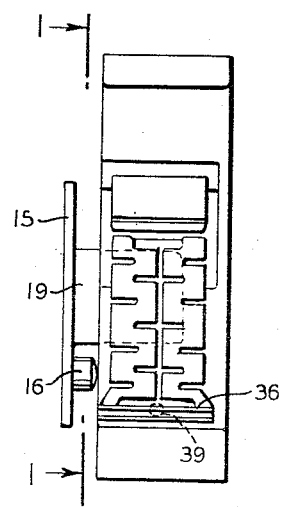
Figure 2 is a view in front elevation showing the device of Figure 1.

Referring to Figures 1 and 2, a tape holder 10 is shown as being formed with a side wall 11 and a bottom 12. An inwardly projecting arm 13 is adapted to be received within the core of a roll of tape indicated in outline at 14. A removable side plate 15 formed complementarily to plate 11 is provided with a locating stud 16 that is adapted to be received within a recess 17 formed in an arm 18 on the holder. The removable side plate is also provided with a hollow sleeve 19 that is received over a stud or post 20 carried by the side plate 11. The sleeve is formed with an eccentric projection 21 and is adapted to support an applicator plate presently to be described.

Figure 3:
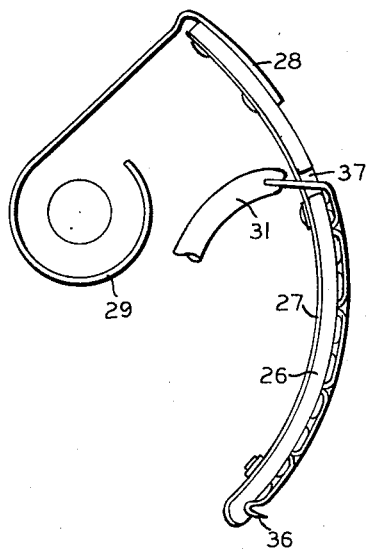
Figure 3 is an enlarged detail view of the tape applying plate and snubber element of Figures 1 and 2.
Figure 4:
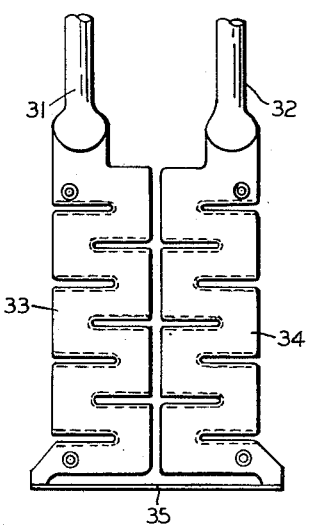
Figure 4 is a developed plan view of the heating element shown in Figure 3.
Figure 5:
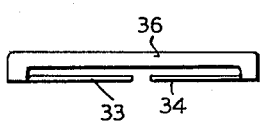
Figure 5 is a bottom view of the heating element of Figure 4.
Figure 6:
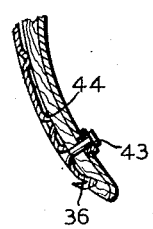
Figure 6 is a partial view in section, taken through the lower end of a portion of the device of Figure 3.

The holder 10 is provided with a second arm 22 which, with the arm 18, serves to support the holder upon any suitable surface when not in use. The holder is also provided with a bridge member 23 having a snubbing surface 24 formed thereon. Spaced from the surface 24 is a backup plate 25 adapted to be engaged by an applicator device as shown in Figure 3. The holder is used by grasping it with the thumb through the core of the tape roll and the fingers extending around the bottom 12.

The applicator device consists of a curved plate 26 preferably formed of a suitable insulating material secured to a supporting plate 27. A spring 28 is secured to the upper end of the plate 27 and extends inwardly, as viewed in Figure 1, terminating in a reentrant sleeve portion 29. This spring lies against one side of the eccentric element 21 and is thus effectively located in the position shown in Figure 1 in which position the spring 28 engages the snubbing surface 24 to thus serve as a snubber element in the manner presently to be described. In this normal inoperative position, the applicator device is spaced from the backup plate 25, as seen in Figure 1.

Spaced inwardly of the applicator plate and carried by the side plate 11 is an insulating support 30 to which leads 31 and 32 are secured, these leads being connected to the ends of an electrical resistance element formed of juxtaposed sinuous elements 33 and 34 connected at their remote ends by a bridge member 35 which is formed of restricted cross-sectional area and with a relatively sharp cutting edge 36. The leads 31 and 32 extend rearwardly of the plate 27 through apertures 37.

A micro switch 38 is mounted on the rear of plate 25 and is provided with an actuating post 39 adapted to be engaged by the lower end of the plate 27 when the latter is depressed against the backup plate 25 during operation. It will be understood that the roll of tape is inserted in the holder, as illustrated in Figure 1, with the free end 40 threaded between the snubbing surface 24 and the snubber spring 28, this free end extending outwardly, as indicated at 41. When the tape is applied to a surface, the holder is moved so that the free end of the tape is moved from the position indicated at 41 to the position shown at 42 and pressed against the desired surface by the applicator device carried by the plate 27. As the holder is pressed against the surface and moved with respect thereto, the tape is unrolled from the roll and applied against the surface under pressure, thus accomplishing the desired taping operation.

To facilitate the securing of the insulating and heating elements in position, rivets 43 may be provided, the resistance elements preferably being formed with downwardly turned edges 44 to facilitate the supporting of the elements on the insulating plate 26 and the formation of a smooth outer surface over which the tape material may slide while being applied to the desired surface.

Figure 7:
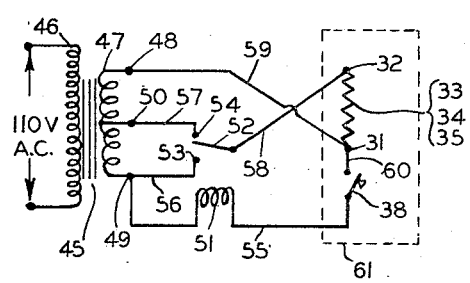
Figure 7 is a schematic wiring diagram of a circuit for use in connection with this invention.

The resistance elements 33 and 34 and the cutting member 35 are heated by an electrical circuit including a transformer 45, the primary 46 of which is connected to a suitable source of electric current as indicated in Figure 7. The secondary 47 of the transformer is provided with end taps 48 and 49 and an intermediate tap 50. A relay having a coil 51, armature 52 and contacts 53 and 54 is connected by a wire 55 to the tap 49 and one terminal of the micro switch 38. The relay contacts 53 and 54 are connected to the taps 49 and 50, respectively, by wires 56 and 57, the relay armature 52 being connected to lead 32 by means of a wire 58. The circuit is completed by a wire 59 which connects the lead 31 with the transformer tap 48, the lead 31 also being connected to the micro switch 38 by a wire 60. In Figure 7 the elements carried by the holder 10 are illustrated within the dotted box 61, all of the remaining elements being remote therefrom and connected only by the wires 55, 58, and 59 which, of course, are preferably carried within a single cable.

In operation the device is connected in the electrical circuit above described, at which time the resistance elements 33 and 34 are connected across the portion of the secondary 47 between taps 48 and 50 (the relay armature being normally positioned as shown in Figure 7). As a result, the applicator member is heated sufficiently to render the adhesive tacky when the tape engages these resistance elements. As the tape is applied to a desired surface by pressing the holder 10 against the adhesive, the plate 27 is moved against the backup plate 25, thus releasing the snubber spring element 28 and permitting the tape to be withdrawn from the roll. At the same time the micro switch 38 is closed by virtue of the engagement of the plate 27 with the post 39, and the relay contact 52 is moved into engagement with terminal 53 to connect the resistance across the entire secondary winding 47 embraced by the taps 48 and 49. The resulting increase in voltage causes a greater current to flow through the resistance elements 33 and 34 and also through the cutter 35 and causes the latter to be heated to a suitable cutting temperature. The greater current also provides additional heat in the resistance elements 33 and 34 to compensate for the heat removed therefrom by the moving tape.

After a desired length of tape has been applied, it is severed by a slight rocking movement of the holder 10 to cause the sharp hot cutting edge 36 to engage and sever the tape. When the holder is removed from the surface, the applicator member and plate 27 move outwardly to the position illustrated in Figure 1, and the circuit of Figure 7 is restored in preparation for further use.

As will be seen from the drawings, the elements of the apparatus are readily assembled and dismounted, and the applicator mechanism is inserted simply by removing the side plate 15 and slipping the re-entrant sleeve portion of the spring 28 over the post 20. As the removable side plate is applied, the spring moves over the eccentric post 21 and is thus automatically secured in assembled position. If the device is to remain inactive for an extended period of time, the exposed adhesive coating on the end 41 of the tape (if of pressure-sensitive type) may be turned back against the bridge member 23 to prevent exposure of the adhesive and thus fouling thereof.

It will be understood that this invention is applicable for use with tapes of various kinds, not only thermoplastic, but pressure-sensitive and the like. These tapes are now commonly manufactured with reinforcing material impregnated therein or surfaced thereon. For example, fiberglass is now commonly utilized, as well as sisal-coated and asphalt-laminated and bonded structures. The heated cutting element thus facilitates cutting not only of all such forms of tapes, but also of tapes formed of vinyl and other plastics or resins.

While the invention has been described with specific reference to the accompanying drawings, it is not to be limited save as defined in the appended claims.

I claim:

1. A device for applying adhesive tapes to surfaces, comprising a holder adapted to receive a roll of adhesive tape, applicator mechanism on the holder having a pressure surface to apply the tape to a desired surface, means to mount the applicator means movably with respect to the holder, electrical heating means on the applicator means, and means actuated upon movement of the applicator means with respect to the holder to increase the temperature of the heating means.

2. A device for applying adhesive tapes to surfaces, comprising a holder adapted to receive a roll of adhesive tape, applicator mechanism on the holder having a pressure surface to apply the tape to a desired surface, electrical heating means on the applicator means, cutting means on the applicator means, means to heat the cutting means, and means to increase the temperature of the cutting means upon application of tape to a surface by the applicator mechanism.

3. A device for applying adhesive tapes to surfaces, comprising a holder adapted to receive a roll of adhesive tape, applicator mechanism on the holder having a pressure surface to apply the tape to a desired surface, electrical heating means on the applicator means, cutting means on the applicator means, means to heat the cutting means, and means to increase the temperature of the heating and cutting means upon application of tape to a surface by the applicator mechanism.

4. A device, according to claim 1, wherein means is provided to urge the applicator means into a normal position away from its tape applying position and the means to increase the temperature is actuated upon movement of the applicator means toward its tape applying position.

5. A manually manipulated device for applying adhesive tape to surfaces, comprising a holder adapted to receive a roll of adhesive tape, an applicator plate for applying the tape to a desired surface, spring means for mounting the plate movably on the holder, an electric heating element on the plate, electrically heated tape cutting means on the plate, and an electrical switch on the holder actuated by movement of the plate.

6. A manually manipulated device for applying adhesive tape to surfaces, comprising a holder adapted to receive a roll of adhesive tape, an applicator plate for applying the tape to a desired surface, spring means for mounting the plate movably on the holder, an electric heating element on the plate, electrically heated tape cutting means on the plate electrically connected to the heating element, an electrical switch on the holder actuated by movement of the plate, and connections to connect the switch to the heating element and cutting means.

7. A device for applying adhesive tape to surfaces, comprising a holder adapted to receive a roll of adhesive tape, an applicator plate for applying the tape to a desired surface, spring means for mounting the plate in spaced relation on the holder, an electric heating element on the plate, electrically heated tape cutting means on the plate electrically connected to the heating element, an electrical switch on the holder actuated by the plate, connections to connect the heating element and cutting means to a source of current of a given first voltage, and connections between the switch and heating element and cutting means to connect the heating element and cutting means to a source of current of higher voltage than the first voltage.

8. A manually manipulated device for applying adhesive tape to surfaces, comprising a holder adapted to receive a roll of adhesive tape, a bridge member on the holder formed with a snubbing surface, an applicator plate having a snubber member adapted to engage the snubbing surface and adapted to apply tape to a desired surface, spring means for mounting the plate normally in spaced relation on the holder and with the snubber member engaging the snubbing surface, an electric heating element on the plate, an electrically heated cutting means on the plate spaced from the snubber member, a switch on the holder actuated by movement of the plate toward the holder, electric connections to connect the heating element and cutting means normally to a source of current at a first voltage, and connections between the switch and heating element and cutting means to connect the same to a source of current at a voltage higher than the first voltage upon movement of the plate toward the holder.

9. A device, according to claim 8, wherein the spring mounting of the plate causes the snubber element to disengage the snubbing surface upon movement of the plate toward the holder.

References Cited in the file of this patent

UNITED STATES PATENTS

| | | |
|---|---|---|
| 1,284,189 | Hadaway | Nov. 5, 1918 |
| 2,123,415 | Gorbatenko | July 12, 1938 |
| 2,401,841 | Singer | June 11, 1946 |
| 2,430,496 | Dodge | Nov. 11, 1947 |
| 2,479,375 | Langer | Aug. 16, 1949 |
| 2,483,715 | Solon | Oct. 4, 1949 |
| 2,523,389 | Oskow | Sept. 26, 1950 |
| 2,560,241 | Pangburn et al. | July 10, 1951 |
| 2,619,247 | Gaubert | Nov. 25, 1952 |